United States Patent
Rouphael et al.

(10) Patent No.: US 7,039,093 B2
(45) Date of Patent: May 2, 2006

(54) ARRANGEMENT FOR ADAPTIVE BASEBAND FILTER SELECTION

(75) Inventors: Antoine J. Rouphael, Escondido, CA (US); Benny Vejlgaard, San Diego, CA (US); Thomas Klingenbrunn, San Diego, CA (US); Lichung Chu, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 781 days.

(21) Appl. No.: 10/173,463

(22) Filed: Jun. 14, 2002

(65) Prior Publication Data

US 2003/0231721 A1    Dec. 18, 2003

(51) Int. Cl.
*H04B 1/69* (2006.01)

(52) U.S. Cl. ............. 375/141; 375/346; 375/316; 375/350; 455/307

(58) Field of Classification Search ......... 375/346, 375/316, 232, 350, 141; 455/307
See application file for complete search history.

(56) References Cited

U.S. PATENT DOCUMENTS

| | | | | |
|---|---|---|---|---|
| 6,470,047 B1 * | 10/2002 | Kleinerman et al. | ........ | 375/232 |
| 6,628,701 B1 * | 9/2003 | Yellin | .......... | 375/148 |
| 6,901,243 B1 * | 5/2005 | Jayaraman et al. | ......... | 455/307 |
| 2002/0057751 A1 * | 5/2002 | Jagger et al. | ............... | 375/346 |
| 2003/0165205 A1 * | 9/2003 | Chu et al. | .................... | 375/346 |

\* cited by examiner

*Primary Examiner*—Stephen Chin
*Assistant Examiner*—Nasrin Hoque

(57) ABSTRACT

A digital signal detector arrangement comprises at least two selectable baseband filters for receiving a digital signal, a signal estimator receiving the output signal of the selected baseband filter, a modulator unit receiving the estimated signal from the signal estimator, a subtractor for subtracting the modulated signal from the received digital signal, and a determination unit receiving the signal from the subtractor for selecting the baseband filter.

25 Claims, 4 Drawing Sheets

ARRANGEMENT FOR ADAPTIVE BASEBAND FILTER SELECTION

BACKGROUND OF THE INVENTION

The present invention relates generally to digital signal detector arrangements and in particular to baseband filter arrangements in wireless systems.

Wireless technology provides many applications for voice and/or data transmission. Today's cell phone networks offer a plurality of services for their customers including digital data services, such as digital email, Internet access, etc. In future applications, such as third generation wireless networks, a plurality of new digital data services will be provided. In particular, Internet applications will be highly improved and made more practical, for example, via high speed digital data transmission. Other digital data application, not yet applicable in today's wireless transmission technology, will be adapted and implemented.

High speed wireless data applications require high data throughput at a significantly lower bit error rate than voice applications. Bit errors in voice applications are usually easy to recover or do not need to be fully recovered due to redundancy capabilities of the human ear; whereas, digital data application often highly rely on the correctness of the submitted data. The quality of data transmissions in a digital environment highly depends on the quality of the transmission channel. Under severe channel conditions, the mobile device throughput is markedly affected due to retransmission of erroneous data packets, thus affecting the entire network throughput. This situation may be ameliorated by the use of antenna diversity and more sophisticated signal processing algorithms.

According to the prior art, decision feedback equalizers are used to compensate for the effects of the transmission channel, which can vary depending on the environment. A basic decision feedback equalizer (DFE) has a forward filter, a feedback filter, and a decision device. Decision feedback equalizers are effective against severe intersymbol-interference. Intersymbol-interference is an effect which creates distortion of the transmitted signal in a specific way. In a sequence of positive and negative symbol pulses, intersymbol-interference is the distortion of a symbol pulse within a particular symbol period caused by the smearing or spillover of symbol pulses of preceding and/or succeeding adjacent symbol pulses into the particular symbol period. The spillover of the preceding and/or succeeding symbol pulses will add to or subtract from the symbol pulse in the particular symbol interval depending upon whether the adjacent interfering symbol pulses are positive or negative in value. In applications with mobile devices, intersymbol-interference occurs due to the multi-path profile of the mobile channel, as well as the above mentioned smearing which is generated due to analog filtering. Unlike linear equalizers, decision feedback equalizers' decision errors propagate in the feedback branch thus affecting the outcome of future bit decisions.

A baseband filter is usually used to limit the signal fed into the equalizer to a predefined frequency band. Different types of interference exist in a wireless network. Co-channel interference is interference caused by two or more transmissions occurring simultaneously in the same channel. In a digital wireless telephone networks, such as GSM networks, the co-channel interference is mainly caused by the spectrum allocated for the system being reused multiple times ("frequency reuse"). The problem may be more or less severe, depending on the reuse factor, but in all cases, a signal received by a handset will contain not only the desired forward channel from the current cell but also signals originating in more distant cells. Adjacent channel interference is caused by extraneous power from a signal in an adjacent channel. Thus, the adjacent channel spills over part of its signal transmission into the used channel and thereby distorts the transmission within that channel. To prevent this kind of interference, different filter characteristics are used to prevent a decreased transmission quality. The choice of the baseband filter is generally a trade off between co-channel and adjacent channel interference rejection. Thus, systems either use a filter having the characteristics which favor co-channel or adjacent channel interference or use a compromise filter.

From the above, it is desirable to provide a filter arrangement for a digital signal detector arrangement which is more flexible.

SUMMARY OF THE INVENTION

According to a specific embodiment, the present invention provides a digital signal detector arrangement that includes at least two selectable baseband filters for receiving a digital signal, a signal estimator receiving the output signal of the selected baseband filter, a modulator unit receiving the estimated signal from the signal estimator, a subtractor for subtracting the modulated signal from the received digital signal, and a determination unit receiving the signal from the subtractor for selecting the baseband filter.

A more complete understanding of this and other specific embodiments and advantages thereof may be acquired by referring to the following description taken in conjunction with the accompanying drawings, in which like reference numbers indicate like features.

DETAILED DESCRIPTION OF SPECIFIC EMBODIMENTS

Figure 1:
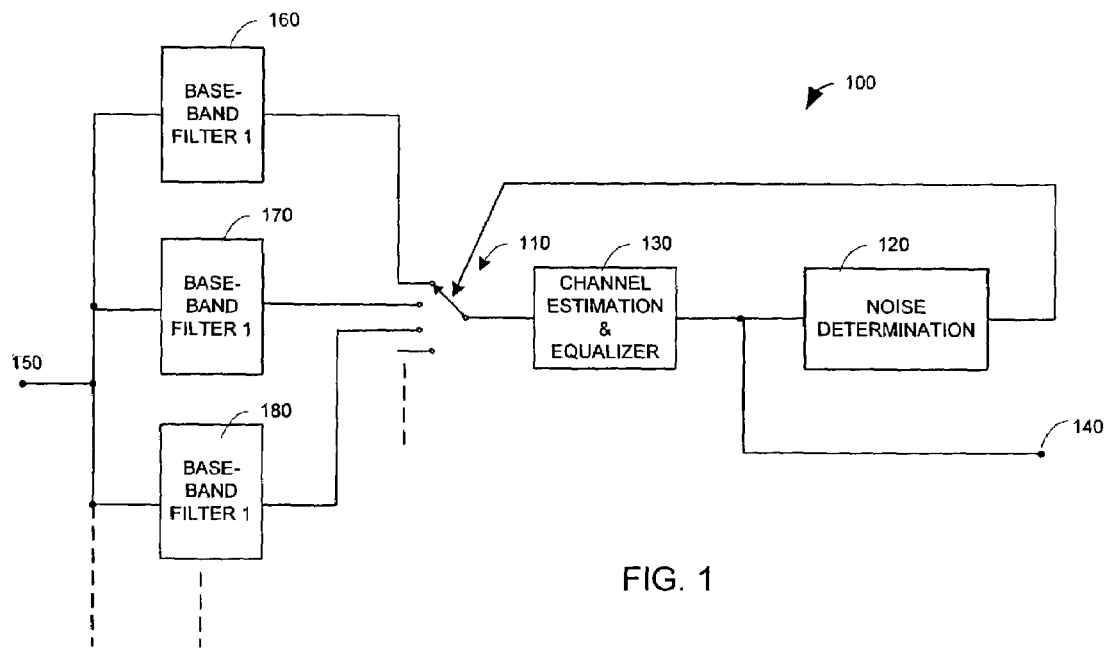
FIG. 1 shows a block diagram of a first exemplary embodiment according to the present invention.

The present invention can be implemented in a wireless product including a digital signal detector arrangement. The digital signal detector arrangement comprises at least two selectable baseband filters for receiving a digital signal, a signal estimator receiving the output signal of the selected baseband filter, a modulator unit receiving the estimated signal from the signal estimator, a subtractor for subtracting the modulated signal from the received digital signal, and a determination unit receiving the signal from the subtractor for selecting the baseband filter.

The signal estimator comprises a Viterbi equalizer and a channel estimation unit receiving the output signal of the selected baseband filter, and the channel estimation unit controls parameters of the Viterbi detector. The modulator may receive the estimated data signal from the Viterbi detector and the output signal from the channel estimation unit. Furthermore, a switch coupled to the baseband filters for selecting the input signal of the baseband filters can be provided. The determination unit can comprise a spectral analyzer receiving the output signal of the subtractor, a first and second correlator unit receiving the spectrum from the spectral analyzer, and a maximum detector unit. The first correlator unit correlates the received signal with at least one adjacent channel interferer spectrum and the second correlator unit correlates the received signal with a co-channel interferer spectrum. The maximum detector unit is coupled with the outputs of the correlator units, wherein the maximum detector selects the respective baseband filter. The first correlator unit can comprises two correlators for correlating a left side adjacent channel interferer spectrum and a right side adjacent channel interferer spectrum, respectively.

In another embodiment, the determination unit may comprise a first and second filter coupled with the subtractor, and a maximum detector unit coupled with the outputs of the filters, wherein the maximum detector selects the respective baseband filter. The first filter can be a high pass filter and the second filter can be a low pass filter. The detector can further be implemented in a digital signal processor.

A method for estimating a digital data sequence includes the steps of: filtering a received digital data sequence using a filter, estimating a data sequence from the filtered signal, determining the type of interferer from the estimated data sequence and the received digital data sequence, and selecting the filter characteristics based upon the interferer determination.

The step of determining can further comprise the steps of: modulating the estimated data sequence, and subtracting the modulated data sequence from the received digital data sequence. The method can further comprise the steps of: performing a spectral analysis of the subtracted data sequence, correlating the spectrum with predefined spectra, and selecting the filter characteristics based upon the correlation result.

A suitable spectral analysis is a Fast Fourier Transformation. The pre-defined spectra can be a co-channel interferer spectrum and a left side and a right side adjacent channel interferer spectrum. The method may further comprise the steps of: high pass filtering the subtracted data sequence, low pass filtering the subtracted data sequence, comparing the high pass filtered and the low pass filtered data sequence, and selecting the filter characteristics based upon the comparison. The method also can include the steps of providing at least two baseband filters for filtering the received digital data sequence, and selecting one of the filters based upon the determined interferer.

Figure 8:
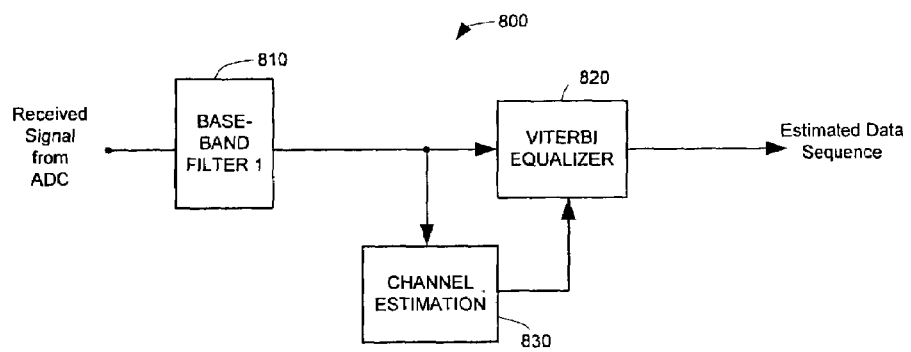
FIG. 8 shows a block diagram of a digital decoder arrangement according to the prior art.

FIG. 8 shows a digital signal estimator arrangement 800 according to the prior art. The received signal from an analog-to-digital converter (ADC) is fed to the input of a baseband filter 810. The output of the baseband filter 810 is fed to the input of an estimator, such as a Viterbi equalizer 820, and to the input of a channel estimation unit 830. The output of the channel estimation unit 830 controls parameters of the Viterbi equalizer 820. The estimated data sequence can be accessed at the output of the Viterbi equalizer 820.

Such a traditional implementation uses a single setting of baseband filter coefficients. The embodiments of the present invention improve such an arrangement by using a plurality of baseband filters, wherein each baseband filter can be optimized for specific interference situations. For example, two baseband filters can be used, each optimized for respectively co-channel and adjacent channel interference, with a selection algorithm deciding which condition applies and on this basis choosing between the two filters.

FIG. 1 shows a general block diagram of an embodiment of the present invention usable, for example, within a wireless communication unit, such as a mobile phone or other wireless device. A digital data sequence is fed from terminal 150 to a plurality of baseband filters 160, 170, 180, . . . (only three filters are shown in FIG. 1 for illustrative purposes). The output of baseband filters 160, 170, and 180 are coupled with a selection switch 110. The output of selection switch 110 is coupled with the input of a channel estimation and equalizer unit 130 for processing the digital data sequence to generate an estimated data sequence at terminal 140. This estimated data sequence is also used by a noise determination unit 120 to calculate an estimated noise spectrum. The calculated noise spectrum is used to determine which baseband filter (160, 170, 180, . . . ) of the arrangement should be selected.

Initially, one of the baseband filters 160, 170, 180 is selected as the default baseband filter. To this end, switch 110 is set in a respective position. In a software implementation, a respective routine or respective parameters for a baseband filter are selected. The estimation and equalizer unit 130 typically is an equalizer combined with a channel estimation unit as will be explained in more detail below. The noise determination unit 120 first generates the difference between the estimated and the real data sequence, for example, by means of a subtractor. This difference data sequence is then further analyzed. For example, a noise spectrum can be processed and the determination of the present interference can be based upon this spectrum, in particular the shape of that spectrum or other suitable properties of the spectrum. Another possibility is to use suitable filters which favor specific interference such as co-channel or adjacent channel interference and thus generate more power when they receive a respective signal generated by a respective interferer. Other determination methods are possible as long as the type of interference is distinguished, thus making it possible to select different types of filter as a baseband filter.

Figure 2:
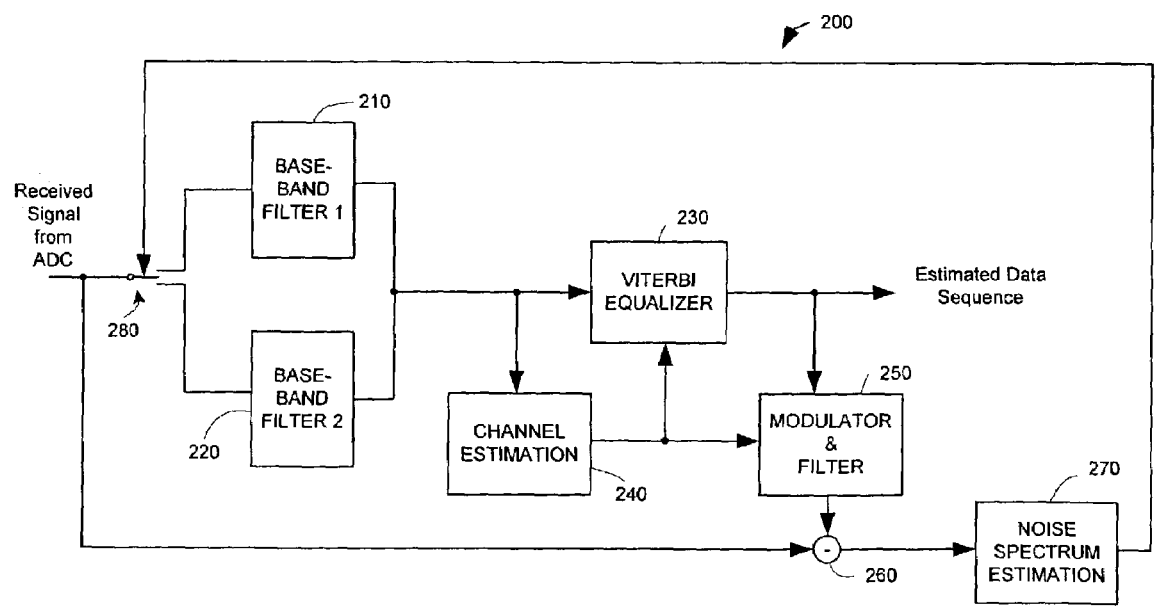
FIG. 2 shows a block diagram of a second exemplary embodiment according to the present invention.

FIG. 2 shows an exemplary embodiment of the present invention in more detail. The received signal from the ADC is fed to a switch 280. The switch 280 comprises two selection paths. The first path leads to the input of a first baseband filter 210 and the second path leads to the input of a second baseband filter 220. The outputs of baseband filters 210 and 220 are then coupled to the inputs of an equalizer 230 and of a channel estimation unit 240. The equalizer 230, can be preferably a Viterbi equalizer; however, any other suitable equalizer can be used. The switch 280 can be placed at the input or output side of the baseband filters 210, 220. FIG. 2 shows a representation of a digital solution implemented, for example, in a digital signal processor. In such an arrangement, usually only the selected path is active at a time in form of a specific routine. However, only a single routine can be implemented and the switch can simply alter specific parameters of the filter, thus, changing from one characteristic (baseband filter 210) to another characteristic (baseband filter 220). The output of Viterbi equalizer 230 provides the estimated data sequence. This sequence is fed to a modulator and filter unit 250 which is also receives the output of channel estimation unit 240. Again, channel estimation unit 240 controls Viterbi equalizer 230. The output of modulator unit 250 is fed to a subtractor 260 which subtracts the signal generated by the modulator and filter unit 250 from the received signal from the ADC. The output of subtractor 260 is then fed to an interference estimation unit or noise spectrum estimation unit 270 which controls switch 280.

The adaptive filter selection operates as follows: The transmitted signal is estimated by taking the estimated data sequence from the output of Viterbi equalizer 230 and re-modulating and filtering it through the estimated channel. The signal, thus generated, is then subtracted from the original or real received signal whereby an approximation of the noise plus interference can be determined. This difference signal carries the characteristics of the respective interferer and, thus, needs to be identified and analyzed. To this end, noise spectrum estimation unit analyzes this signal and based on the respective properties determines which type of interference scenario applies. This decision is subsequently fed back to a switch, selecting one of the two or more baseband filters 210 or 220. Such a selection can be made on a burst-by-burst basis, during a channel adaptation sequence, at pre-selected time intervals or any other suitable times.

Figure 4:
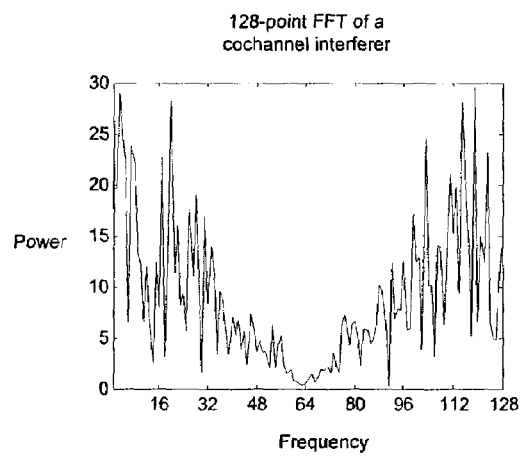
FIG. 4 shows and exemplary Fast Fourier Transformation of a signal having co-channel interference.
Figure 5:
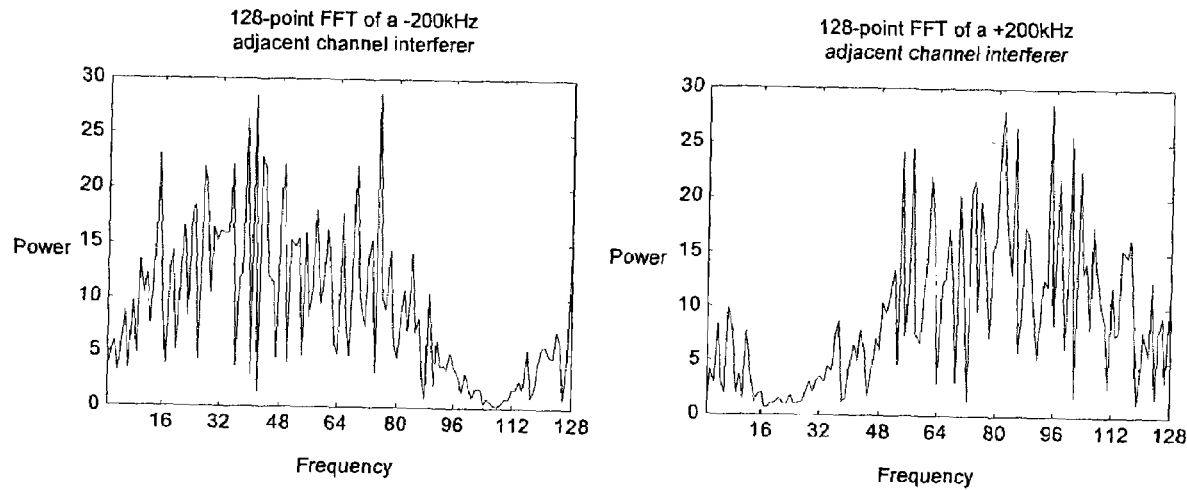
FIG. 5 shows and exemplary Fast Fourier Transformation of a signal having adjacent-channel interference.

The interference determination can be done using different approaches. A first embodiment approximates the noise spectrum of the difference signal by submitting the signal to a Fast Fourier Transformation (FFT). Subsequently the approximated noise spectrum is correlated with respectively a co-channel interferer spectrum and an adjacent channel interferer spectrum. The co-channel interferer spectrum and the adjacent interferer spectrum used for the correlation can be a typical interferer spectrum as shown in FIGS. 4 and 5 and will be explained in more detail below. The maximum of these two correlations determines which type of interferer scenario applies.

Figure 3:
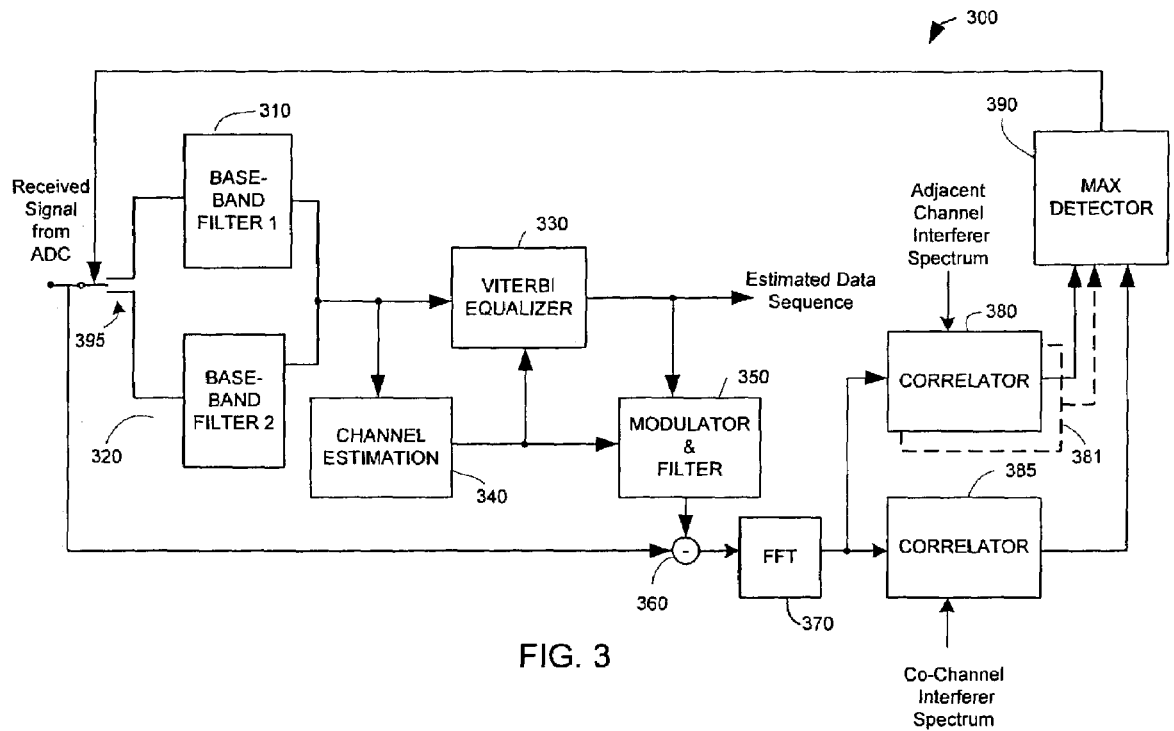
FIG. 3 shows a block diagram of another exemplary embodiment according to the present invention.

FIG. 3 shows an exemplary embodiment of an arrangement according to FIG. 2 with a FFT noise spectrum estimation unit. The received signal from the ADC is fed to a switch 395. The switch 395 is similar to switch 280 of FIG. 2 and comprises two selection paths. The first path leads to the input of a first baseband filter 310 and the second path leads to the input of a second baseband filter 320. The outputs of baseband filters 310 and 320 are then coupled to the inputs of an equalizer 330 and of a channel estimation unit 240. The equalizer 330, again can be preferably a Viterbi equalizer; however, any other suitable equalizer can be used. The location of the switch 395 can vary as already described in connection with FIG. 2. The output of Viterbi equalizer 330 provides the estimated data sequence. This sequence is fed to a modulator and filter unit 350 which also receives the output of channel estimation unit 340. Again, channel estimation unit 340 controls Viterbi equalizer 330. The output of modulator unit 350 is fed to a subtractor 360 which subtracts the signal generated by the modulator unit 350 from the received signal from the ADC. The output of subtractor 360 is then fed to a Fast Fourier Transformation unit 370. The estimated noise spectrum processed by Fast Fourier Transformation unit 370 is fed to the inputs of two correlator units 380 and 385. The first correlator unit 380 receives an adjacent channel interferer spectrum as a second input whereas the second correlator unit 385 receives a co-channel interferer spectrum as a second input. The adjacent channel interferer spectrum usually depends on the fact whether the adjacent channel is higher or lower in frequency. Thus two types of spectra are needed, namely a "left side" spectrum and a "right side" spectrum as shown in FIG. 5. Therefore, as indicated in FIG. 3, either two correlators 380 and 381 are needed wherein correlator 380 correlates the "left side" spectrum and correlator 381 correlates the "right side" spectrum with the estimated noise spectrum, or one correlator is used that correlates the "left side" spectrum followed by the "right side" spectrum. The highest result can then be forwarded to the maximum detector because in both cases the same type of baseband filter will be used. The output signals of correlator units 380/381 and 385 are then fed to the inputs of a maximum detector 390 which controls switch 395.

FIG. 4 shows a typical spectrum for co-channel interferer. The spectrum is calculated using a 128-point Fast Fourier Transformation from a sample interference and stored in a memory. FIG. 5 shows typical spectrum for an adjacent channel interferer. Two spectra, a "left side" spectrum and a "right side" spectrum, are shown, again using a 128-point Fast Fourier Transformation. For example, the spectrum on the "left side" is for −200 kHz whereas the spectrum on the "right side" is for +200 kHz. These calculated spectra can be used by the correlators to determine the character or type of interference. Also, averaged spectra can be used, for example, a plurality of typical co-channel or adjacent interferer spectra can be sampled and averaged to be used as the second correlator input signal.

Figure 6:
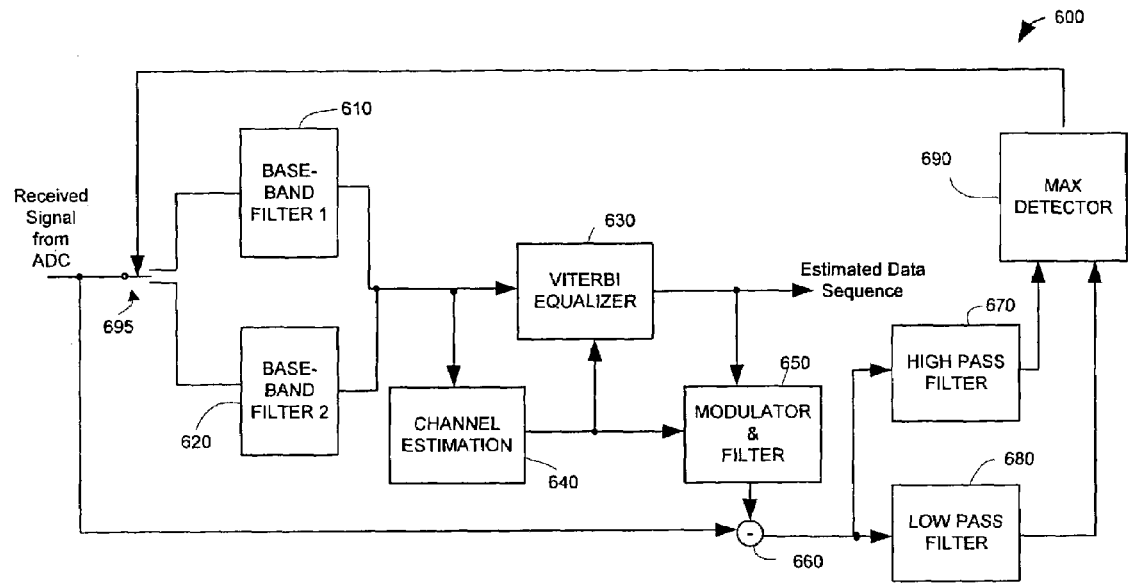
FIG. 6 shows a block diagram of yet another exemplary embodiment according to the present invention.

FIG. 6 shows another exemplary embodiment of the present invention. This embodiment uses a different method to estimate the noise spectrum by using two different filters and comparing the signal power after filtering by a maximum detector. Elements 610–660, and 695 correspond to elements 310–360, and 695, respectively. Thus, this part of the arrangement can be implemented identical to the arrangement shown in FIG. 3. The output of subtractor 660 is then fed to the input of a high pass filter 670 and to the input of a low pass filter 680. The respective outputs of high pass filter 670 and low pass filter 680 are fed to the input of maximum detector 690. Depending on the output of the filters 670 and 680, maximum detector 690 controls switch 695 to select either baseband filter 610 or baseband filter 620.

This method will be more efficient, in particular, within implementations, such as, digital signal processors because most digital signal processors are optimized for filtering rather than for Fast Fourier Transformation operations. Furthermore, filtering uses much less processor power than a FFT and no correlation database has to be maintained.

Figure 7A:
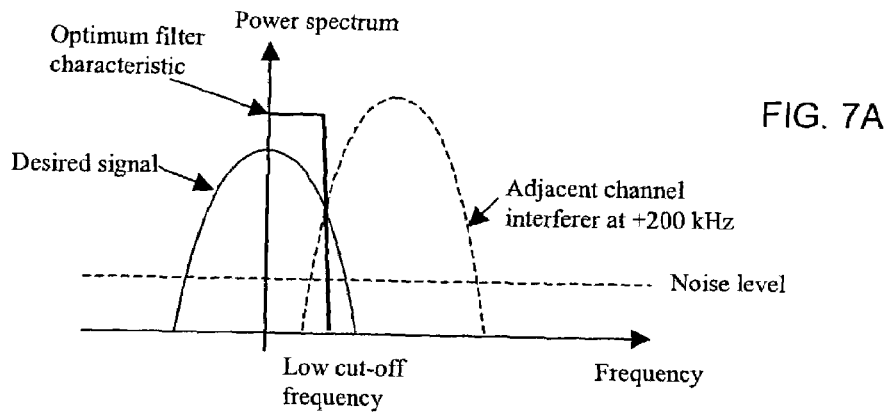
FIGS. 7A and 7B show the filter characteristics of optimum filters for adjacent-channel interference and co-channel interference respectively.
Figure 7B:
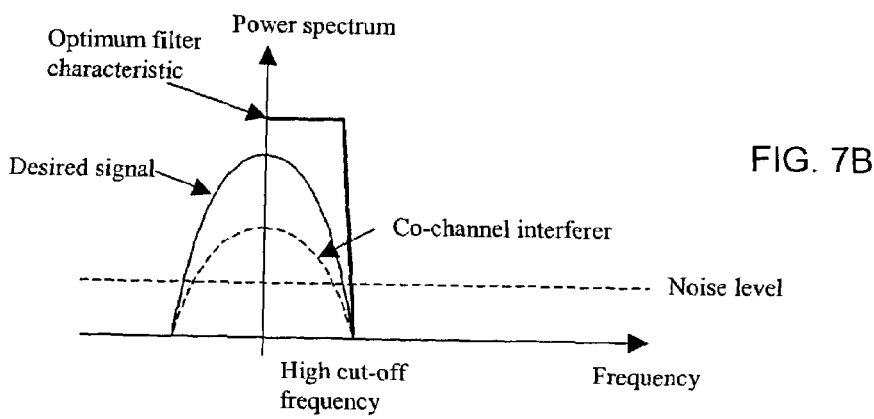

The typical transfer function characteristics of the baseband filters (210; 310; 610) and (220; 320; 620), respectively are shown in FIGS. 7A and 7B. Both figures show power spectra for the desired signal and the respective channel interferer. In FIG. 7A, only a "right side" channel interferer is shown. A filter characteristic for the adjacent channel interferer baseband filter is shown in FIG. 7A and a respective filter characteristic for the co-channel interferer baseband filter is shown in FIG. 7B. These characteristics are exemplary, and other suitable characteristics may be chosen. In addition, a noise level is indicated by a dotted line. The adjacent channel interference may extend far into the spectrum of the desired signal. Therefore, the adjacent channel baseband filter has a lower cut-off frequency to provide a strong rejection of the in-band adjacent channel interference, at the cost of rejecting the high-frequency components of the desired signal. The co-channel baseband filter has a higher cut-off frequency to allow more of the desired signal to pass through.

What is claimed is:

1. A digital signal detector arrangement comprising:
   at least two selectable baseband filter for receiving a digital signal;
   a signal estimator receiving the output signal of the selected baseband filter;
   a modulator unit receiving the estimated signal from the signal estimator;
   a subtractor for subtracting the modulated signal from the received digital signal; and
   a determination unit receiving the signal from the subtractor for selecting the baseband filter.

2. The detector according to claim 1, wherein the signal estimator comprises a Viterbi equalizer and a channel estimation unit receiving the output signal of the selected baseband filter, and wherein the channel estimation unit controls parameters of the Viterbi detector.

3. The detector according to claim 2, wherein the modulator receives the estimated data signal from the Viterbi detector and the output signal from the channel estimation unit.

4. The detector according to claim 1, further comprising a switch coupled to the baseband filters for selecting the input signal of the baseband filters.

5. The detector according to claim 1, wherein the determination unit comprises:
   a spectral analyzer receiving the output signal of the subtractor,
   a first and second correlator unit receiving the spectrum from the spectral analyzer, wherein the first correlator unit correlates the received signal with at least one adjacent channel interferer spectrum and the second correlator unit correlates the received signal with a co-channel interferer spectrum; and
   a maximum detector unit coupled with the outputs of the correlator units, wherein the maximum detector selects the respective baseband filter.

6. The detector according to claim 5, wherein the first correlator unit comprises two correlators for correlating a left side adjacent channel interferer spectrum and a right side adjacent channel interferer spectrum, respectively.

7. The detector according to claim 1, wherein the determination unit comprises:
   a first and second filter coupled with the subtractor; and
   a maximum detector unit coupled with the outputs of the filters, wherein the maximum detector selects the respective baseband filter.

8. The detector according to claim 7, wherein the first filter is a high pass filter and the second filter is a low pass filter.

9. The detector according to claim 1, wherein the detector is implemented in a digital signal processor.

10. A method for estimating a digital data sequence, comprising the steps of:
    filtering a received digital data sequence using a filter;
    estimating a data sequence from the filtered signal;
    determining the type of interferer from the estimated data sequence and the received digital data sequence; and
    selecting the filter characteristics based upon the interferer determination.

11. The method according to claim 10, wherein the step of determining comprises the steps of:
    modulating the estimated data sequence; and
    subtracting the modulated data sequence from the received digital data sequence.

12. The method according to claim 11, further comprising the steps of:
    performing a spectral analysis of the subtracted data sequence;
    correlating the spectrum with pre-defined spectra; and
    selecting the filter characteristics based upon the correlation result.

13. The method according to claim 12, wherein the spectral analysis is a Fast Fourier Transformation.

14. The method according to claim 12, wherein the pre-defined spectra are a co-channel interferer spectrum and a left side and a right side adjacent channel interferer spectrum.

15. The method according to claim 11, further comprising the steps of:
    high pass filtering the subtracted data sequence;
    low pass filtering the subtracted data sequence;
    comparing the high pass filtered and the low pass filtered data sequence; and selecting the filter characteristics based upon the comparison.

16. The method according to claim 10, further providing the steps of:
    providing at least two baseband filters for filtering the received digital data sequence;
    selecting one of the filters based upon the determined interferer.

17. A wireless communication unit including a digital signal detector arrangement comprising:
    at least two selectable baseband filter for receiving a digital signal;
    a signal estimator receiving the output signal of the selected baseband filter;
    a modulator unit receiving the estimated signal from the signal estimator;
    a subtractor for subtracting the modulated signal from the received digital signal; and
    a determination unit receiving the signal from the subtractor for selecting the baseband filter.

18. A wireless communication unit according to claim 17, wherein the signal estimator comprises a Viterbi equalizer and a channel estimation unit receiving the output signal of the selected baseband filter, and wherein the channel estimation unit controls parameters of the Viterbi detector.

19. A wireless communication unit according to claim 18, wherein the modulator receives the estimated data signal from the Viterbi detector and the output signal of the channel estimation unit.

20. A wireless communication unit according to claim 17, further comprising a switch coupled to the baseband filters for selecting the input signal of the baseband filters.

21. A wireless communication unit according to claim 17, wherein the determination unit comprises:
    a spectral analyzer receiving the output signal of the subtractor,
    a first and second correlator unit receiving the spectrum from the spectral analyzer, wherein the first correlator unit correlates the received signal with at least one adjacent channel interferer spectrum and the second correlator unit correlates the received signal with a co-channel interferer spectrum; and
    a maximum detector unit coupled with the outputs of the correlator units, wherein the maximum detector selects the respective baseband filter.

22. A wireless communication unit according to claim 21, wherein the first correlator unit comprises two correlators for correlating a left side adjacent channel interferer spectrum and a right side adjacent channel interferer spectrum, respectively.

23. A wireless communication unit according to claim 17, wherein the determination unit comprises:
   a first and second filter coupled with the subtractor; and
   a maximum detector unit coupled with the outputs of the filters, wherein the maximum detector selects the respective baseband filter.

24. A wireless communication unit according to claim 23, wherein the first filter is a high pass filter and the second filter is a low pass filter.

25. A wireless communication unit according to claim 17, wherein the detector is implemented in a digital signal processor.

* * * * *